(12) United States Patent
Sardari

(10) Patent No.: US 6,655,137 B1
(45) Date of Patent: Dec. 2, 2003

(54) ADVANCED COMBINED CYCLE CO-GENERATION ABATEMENT SYSTEM

(76) Inventor: Amir A. Sardari, 1011 Miramar, Laguna Beach, CA (US) 92651

( * ) Notice: Subject to any disclaimer, the term of this patent is extended or adjusted under 35 U.S.C. 154(b) by 0 days.

(21) Appl. No.: 10/180,465

(22) Filed: Jun. 25, 2002

Related U.S. Application Data

(60) Provisional application No. 60/300,791, filed on Jun. 25, 2001.

(51) Int. Cl.[7] ............................. F01B 29/10; F01N 5/04; F01N 3/00
(52) U.S. Cl. ............................. 60/517; 60/280; 60/285; 60/286; 60/39.6; 60/670
(58) Field of Search ........................ 60/39.6, 517, 670, 60/280, 285, 286

(56) References Cited

U.S. PATENT DOCUMENTS

| | | |
|---|---|---|
| 3,463,599 A | 8/1969 | Welty, Jr. |
| 3,530,807 A | 9/1970 | Zalman |
| 3,548,761 A | 12/1970 | Zalman |
| 4,078,503 A | 3/1978 | von Dreusche, Jr. |
| 4,101,632 A | 7/1978 | Lamberti et al. |
| 4,206,722 A | 6/1980 | Nolley, Jr. |
| 4,246,853 A | 1/1981 | Mehta |
| 4,395,958 A | 8/1983 | Caffyn et al. |
| 4,452,152 A | 6/1984 | John et al. |
| 4,473,013 A | 9/1984 | John et al. |
| 4,485,746 A | 12/1984 | Erlandsson |
| 4,718,361 A | 1/1988 | Berry |
| 4,726,302 A | 2/1988 | Hein et al. |
| 4,761,132 A | 8/1988 | Khinkis |
| 4,846,082 A | 7/1989 | Marangoni |
| 4,870,910 A | 10/1989 | Wright et al. |
| 4,951,579 A | 8/1990 | Bell |
| 5,215,018 A | 6/1993 | Sardari et al. ............... 110/235 |
| 5,249,952 A | 10/1993 | West et al. |
| 5,315,823 A * | 5/1994 | Nishikawa et al. ........... 60/286 |
| 5,366,699 A | 11/1994 | Milfeld et al. |
| 5,460,511 A | 10/1995 | Grahn |
| 5,520,123 A | 5/1996 | Chappell et al. |
| 5,673,553 A | 10/1997 | Maese et al. |
| 5,718,112 A | 2/1998 | Dodge et al. |
| 5,941,184 A | 8/1999 | Casacia et al. |
| 5,964,085 A | 10/1999 | Newby |
| 6,024,029 A | 2/2000 | Clark |
| 6,089,169 A | 7/2000 | Comiskey |
| 2002/0017098 A1 * | 2/2002 | Johansson ..................... 60/517 |

\* cited by examiner

*Primary Examiner*—Sheldon J. Richter
(74) *Attorney, Agent, or Firm*—Stout, Uxa, Buyan & Mullins, LLP; Frank J. Uxa; Jo Anne M. Ybaben

(57) ABSTRACT

The present invention is an advanced co-generation system for abating solid wastes, hydrocarbons and other volatile organic compounds (VOC's) produced by various processes utilizing a Stirling cycle engine, turbines or other internal combustion engines doing useful work. The turbine exhaust is directed into an abatement chamber which may include a catalyst that is designed to operate at high temperature and includes supplementary fuel and air inputs which are controlled by a computer that receives sensor inputs to achieve the requisite heat ranges necessary to convert exhaust and VOC's to non-toxic substances. The exhaust generated by the abatement chamber is directed to a Stirling cycle engine for additional heat generation and recovery. The exhaust generated from this process can also be used to perform direct or indirect heating.

17 Claims, 3 Drawing Sheets

ADVANCED COMBINED CYCLE CO-GENERATION ABATEMENT SYSTEM

BACKGROUND OF THE INVENTION

1. Related Application

This application claims the benefit of U.S. provisional application Serial No. 60/300,791 filed Jun. 25, 2001, the disclosure of which is incorporated in its entirety herein by reference.

2. Field of the Invention

This invention relates to pollutant abatement generally, and more particularly to a method and apparatus for abating hydrocarbons, volatile organic compounds exhausted by a turbine or other internal combustion engine and solid wastes.

3. Description of the Prior Art

Air quality has been an increasing public concern over the past half century. In that time, the scientific community has worked to improve its understanding of the origins of pollutants that predominate in the air of most major cities in the United States. An increasing amount of this air pollution can be attributed to the release of hydrocarbons and other volatile organic compounds (VOC's). As a result, it has become increasingly important to control and reduce the amount of these toxins that are released into the atmosphere. To that end, regulatory authorities have required that VOC's and other volatile hydrocarbons that are hazardous to the health of humans and other organisms, be treated so as to become products that are more environmentally acceptable than their original components.

The most familiar volatile compound reduction technique is the control of fuel vaporization by vapor recovery techniques first used on automobiles and currently used on gasoline stations located in nonobtainment areas. As a result, the steady increase in releases of these compounds has leveled off and in some areas has declined.

Manufacturing sites are primarily responsible for the release of VOC's and other hydrocarbons. Unfortunately, solvent vaporization and hydrocarbon byproducts are key to many manufacturing processes that are critical to everyday life. The manufacture of everyday consumer products result in the atmospheric release of substantial amounts of organic compounds including pentane, ethanol, methanol, and ethyl acetate, among others. While the control of these VOC's is essential to the safety of the environment, a cost effective means for control of these compounds remains a struggle within the always competitive manufacturing industry.

Also in common use today, is the thermal oxidizer. This method allows volatile solvents to be released in amounts generally less than a few thousand parts per million into the plant air system. This air is then selectively collected and fed into a combustion chamber where it is mixed with enough natural gas to sustain combustion. This mixture is then ignited so as to incinerate the volatile solvent as well as the natural gas and to thereby produce carbon dioxide and water vapor. These thermal oxidizers are complicated devices which represent a huge capital expense and the operating costs of which typically increase the yearly energy cost in excess of 25%.

Previous control systems have controlled the amount of added fuel such as natural gas, propane, diesel fuel and the like, which is fed to the thermal oxidizer. Previous control systems have similarly controlled the amount of air fed to the thermal oxidizer which can act to control or regulate VOC emissions. Therefore, when demand is low the fuel and air fed to the thermal oxidizer is maintained at a relatively high level so as to insure VOC thermal oxidation. Such control systems result in a substantial amount of energy being wasted by exhausting hot flue gases to the atmosphere. Moreover, previous systems utilized very severe conditions which often involved unneeded combustion, which combustion itself often resulted in unnecessary air pollution.

In certain solid waste incinerators such as U.S. Pat. Nos. 3,530,807 and 3,548,761 to Zalman, the temperature in the combustion chamber is used to control the amount of fuel fed to the incinerator. In others, such as the inventor's own U.S. Pat. No. 5,215,018, a controlled feed of gaseous materials are sent to a thermal oxidizer for cost effective thermal oxidation, as well as the creation of added heat used for secondary purposes.

Another current control technique uses solvent recovery that pass the air from the plant through an activated charcoal filter. In this method the charcoal may be periodically heated driving off highly concentrated volatile compounds into a chilled condensing system. The output is a liquid organic compound which may or may not require hazardous waste treatment. As can be expected, the costs of such an operation are significantly more expensive than a thermal oxidizer system, and thus, such a system is less attractive for the typical industrial business.

Accordingly, an efficient and cost effective device and method for the destruction of hydrocarbons and other VOC's remains.

SUMMARY OF THE INVENTION

The present invention relates to a co-generation system for abating solid wastes, hydrocarbons and other volatile organic compounds (VOC's) exhausted by a turbine or other internal combustion engine doing useful work. The present invention may also be utilized in a factory setting to generate power thereby reducing the overall manufacturing or industrial costs. The present invention may also neutralize exhaust to a non-toxic state by incinerating it in a secondary abatement chamber. Other unrelated pollutants such as solid waste, may be added to the abatement chamber for neutralization. The abatement chamber may also be equipped with a special catalyst to more efficiently destroy VOC's. A gas turbine may also be used for added heat transfer to the abatement chamber. In the present invention, the abatement chamber is supplied by supplementary fuel and air inputs controlled by a computer that receives sensor inputs to achieve the requisite heat ranges necessary to convert the exhaust and VOC's to non-toxic substances. Additionally, the present invention may transport the exhaust from the abatement chamber directly into a Stirling cycle engine to generate additional electricity as well as utilize exhaust from the Stirling engine to improve overall thermal efficiencies. The heat generated by the abatement chamber and/or the Stirling cycle engine can be used for useful work as well.

The primary advantage to this system is to use the combination of the turbine and the Stirling cycle engine to produce heat and energy which is used to help neutralize pollutants including VOC's and solid waste, while also recycling the heat generated by the Stirling cycle engine and the supplementary fuel and VOC's to generate heat and electricity for useful work.

Each and every feature described herein, and each and every combination of two or more of such features, is included within the scope of the present invention provided that the features included in such a combination are not mutually inconsistent.

These and other aspects and advantages of the present invention are set forth in the following detailed description and claims, particularly when considered in conjunction with the accompanying drawings in which like parts bear like reference numerals.

DESCRIPTION OF A PREFERRED EMBODIMENT

Figure 1:
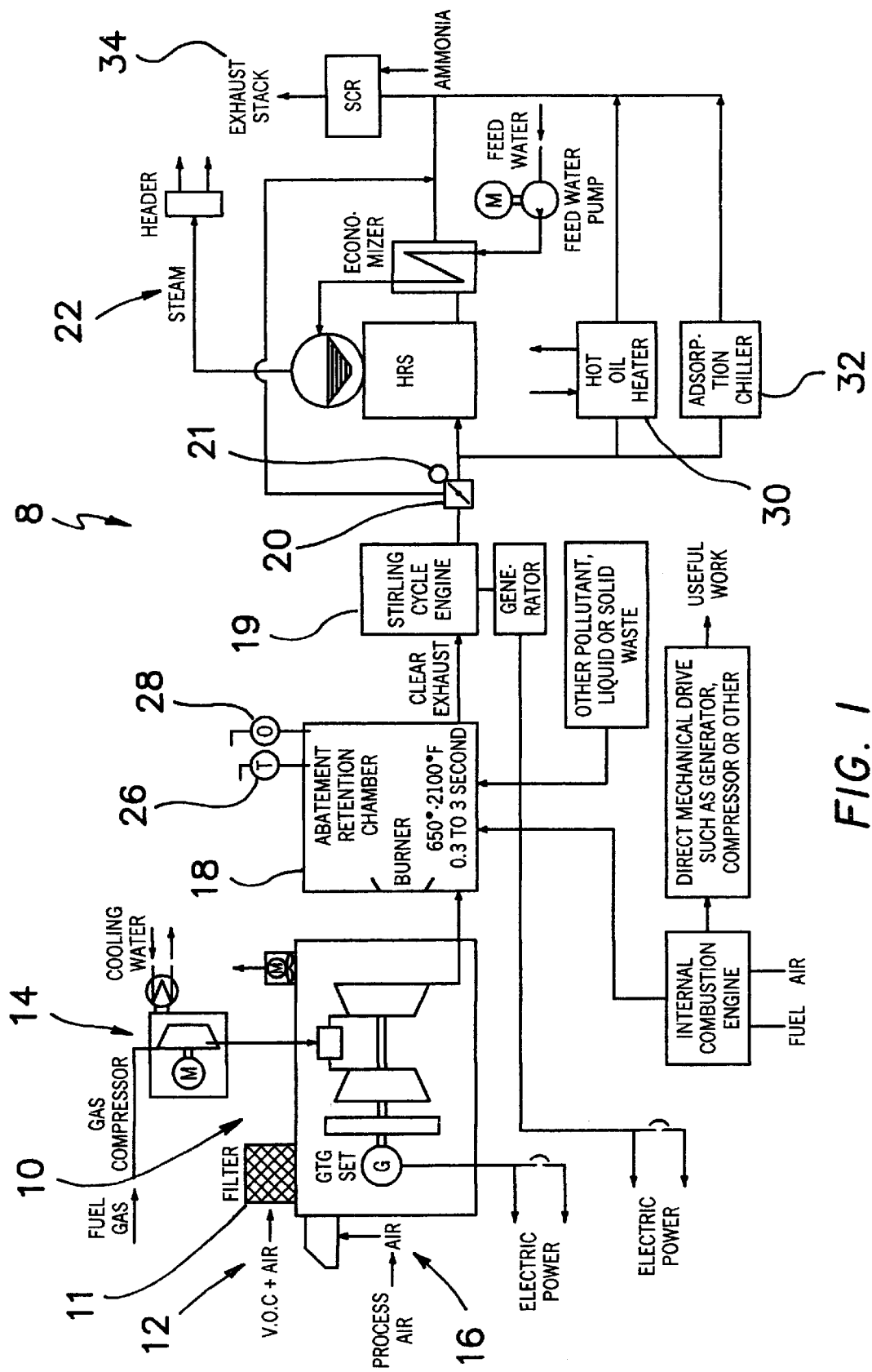
FIG. 1 is a schematic of the combined co-generation system for various waste products of the present invention.

In the preferred embodiment of the advanced combined co-generation solid waste and VOC abatement system, generally identified as 8, in accordance with the present invention, includes a thermal oxidation apparatus, shown generally at 10, an abatement retention chamber 18, a Stirling cycle engine 19, an exhaust damper 20 and a boiler section, shown generally at 22. The thermal oxidation apparatus 10 further includes a gas intake assembly 12, a fuel intake assembly 14, and an air intake assembly 16.

Referring to FIG. 1, the combined system 8 is controlled, as discussed in detail hereinafter, from a centralized control panel, not shown. The various components of the control panel may be selected from conventional and commercially available components which individually or together are useful to receive and transmit the control signals and alarm signals described herein. Although each of the parts of the combined system 8 is discussed separately, the proper functioning of the combined system 8 depends on each of these parts working together effectively.

The thermal oxidation apparatus 10 includes gas intake assembly 12 which is comprised of a gas feed line which passes VOC contaminated air into thermal oxidation apparatus 10 from, for example, one or more manufacturing facilities or storage facilities. Substantially any VOC including hydrocarbons, substituted hydrocarbons, or other organic compounds and mixtures thereof can be thermally oxidized in accordance with the present invention, including but not limited to hazardous materials. The VOC's and air pass through a filter 11 into the thermal oxidation apparatus 10.

An air inlet assembly 16 is provided to pass fresh air into the thermal oxidation apparatus 10 as necessary for efficient processing of the waste products. A fresh air damper is located in the intake line to selectively permit the intake of fresh air into the thermal oxidation apparatus 10. The positioning of the fresh air damper is controlled by signals received from the control panel. Generally, the fresh air damper is closed when the amount of VOC's is sufficient to provide for the desired operation of the thermal oxidation apparatus 10. If additional fresh air is required for operation, e.g. to generate the desired amount of steam, the damper is opened to provide same. The VOC's and air pass into a combustion zone where fuel materials such as natural gas, propane, diesel fuel and the like, are also passed into the combustion zone through the fuel intake assembly 14.

The fuel intake assembly 14 includes a fuel source, a gas compressor, and a water cooling assembly. The VOC's, air and fuel are fed into the burner section where a flame is ignited and maintained. The combustion zone, burner section and chamber may be of conventional design. The conditions in the thermal oxidation apparatus 10 are sufficient to combust the fuel and oxygen fed to the combustion zone. Excess oxygen is preferably present to provide for substantially complete combustion of the fuel. At least a portion of the VOC's fed into the combustion zone are effectively thermally oxidized in the combustion zone to form one or more compounds which are more environmentally acceptable than the compound or compounds making up the VOC fed to the thermal oxidation apparatus 10.

The hot effluent gases from the thermal oxidation apparatus 10 pass on to the abatement retention chamber 18 located downstream of thermal oxidation apparatus 10. Here, the abatement chamber 18 is to have an average temperature range of between 650° F. and 2100° F. and the effluent gases will remain in the abatement chamber 18 for between 0.3 to 3 seconds. Inside the abatement chamber 18, the remaining VOC's and other compounds within the effluent gas from the thermal oxidation apparatus 10 will be effectively incinerated or oxidized. In practice, the size of the abatement chamber 18 can vary to suit the particular application involved and to provide sufficient residence time for effective VOC oxidation. The final exhaust stream will have the VOC's destroyed at and above the minimum 95% set by the United. States Environmental Protection Agency and generally in the range of about 99.99% based on BACT and MACT requirements.

Additionally, the combined system of the present invention is designed to accept other pollutants, including other liquids and gases, as well as solid wastes, for incineration in the abatement chamber 18. Exhaust from an internal combustion engine may also be passed to the abatement chamber 18 for oxidation at this stage.

The abatement chamber 18 is conveniently lined with high temperature insulation, refractory, ceramic, or the like, to retain heat. Important features of the abatement chamber 18 are the temperature sensor 26 and oxygen sensor 28 which enable it to automatically monitor and create a consistent operating temperature within the chamber 18. Additionally, the VOC's burned during incineration contribute to the energy needed for abatement. The temperature sensor 26 may be comprised of a conventional thermocouple which measures or otherwise senses the temperature and passes a signal to the control panel, thus when the temperature is below a predetermined value, the control panel can send a signal to the fuel intake assembly 14 to increase the amount of fuel passed into the combustion zone. In this way the temperature can be controlled to provide efficient conditions for VOC and solid waste incineration. Similarly, the oxygen sensor 28 measures or otherwise senses the amount of oxygen present in the abatement chamber 18 and passes a signal to the control panel to thereby increase or decrease the amount of air passed into the combustion zone so as to provide the most efficient conditions for VOC incineration.

The exhaust gases produced in the abatement chamber 18 pass into the Stirling cycle engine 19 to thereby create additional electricity and further assist the destruction of VOC's and other waste products including solid wastes. The Stirling cycle engine 19 operates using conventional Stirling cycle technique whereby hot air external combustion occurs to produce work using a fixed quantity of natural gas pumped between hot and cold chambers. The combined system 8 of the-present invention can recover the exhaust produced by the Stirling cycle engine 19 which can be used for additional heat recovery and for direct or indirect heating.

In order to achieve greater efficiency from a Stirling cycle engine the exhaust temperatures transported from the abatement chamber 18 must be as high as possible. In such a system, the controller will modulate the fuel intake assembly 14 and the temperature sensor 26 of the abatement chamber 18 as well as operation of the Stirling cycle engine 19.

The exhaust gases produced by the Stirling cycle engine 19 pass into exhaust damper 20 where they are selectively transferred to boiler section 22 for direct or indirect heating. The boiler section 22 can produce steam, or the exhaust gases may be used to heat oil via heater 30 or passed through an absorption chiller 32 for disposal through the exhaust stack 34. The operation of the boiler section 22 is controlled via one or more pressure sensors associated with the exhaust damper 20 and which controls its operation. Typically, if the pressure sensed is above a predetermined value, a signal is passed to the exhaust damper motor 21 to open the damper 20 which thereby reduces the amount of steam generated and allows the exhaust gas to pass out through the exhaust stack 34. Conversely, if the sensor senses that the pressure is below a certain predetermined value, the exhaust damper motor 21 is activated to close the damper 20 thereby directing the exhaust gases to generate increased amounts of steam.

These same pressure sensors also act to monitor the pressure levels and to control such pressure via the control panel. When the pressure levels are below a certain minimum value, a signal is passed via the control panel, which in turn sends a signal to the fuel intake assembly 14 to increase the amount of fuel sent to the combustion zone as well as the amount of VOC's and air so as to sufficiently combust the increased amounts of fuel. Alternatively, the exhaust damper 20 may be used to control the path of the exhaust gas directly to the atmosphere.

Although the embodiment illustrated shows a heat transfer to generate steam, and steam generation is preferred, the present invention is applicable to employing heat transfer from the exhaust gas to generate other useful products, such as hot water, hot oil and the like, instead of, or in combination with, steam generation. Additionally, the present invention is applicable for employing the thermal energy of the Stirling cycle engine to produce further electrical power and to recover the thermal energy from the exhaust of the Stirling cycle engine. Generally, the generation and employment of exhaust gas to create such other useful products is within the scope of the present invention.

Figure 2:
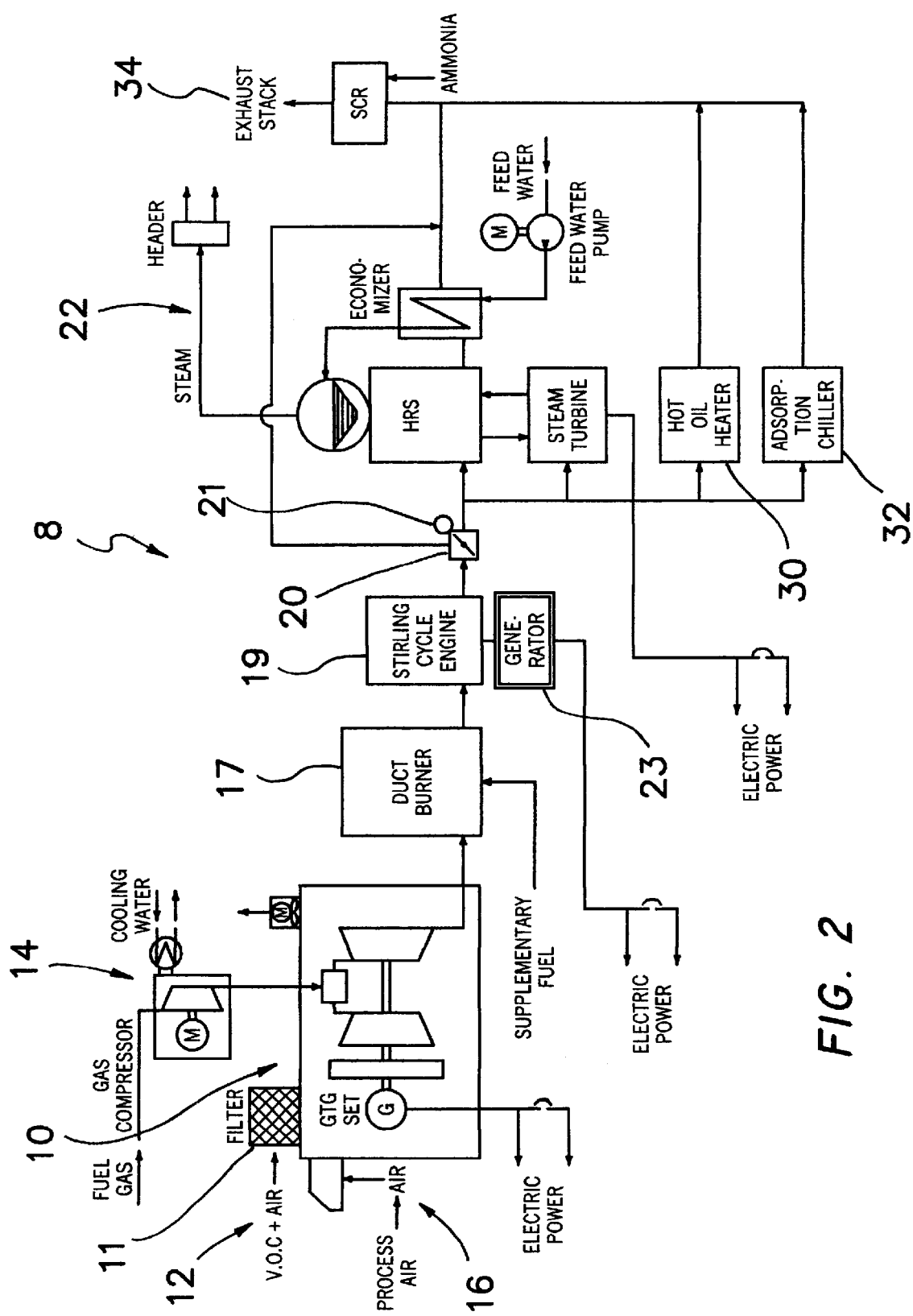
FIG. 2 is a schematic of the combined co-generation system for gaseous fuel of the present invention.

In another embodiment, referring now to FIG. 2, the system represented here is otherwise identical to that described and shown in FIG. 1 but utilizes a duct burner 17 which has an average temperature of between 600° and 1000° F. which acts to further increase the electrical power output of the Stirling cycle engine 18. In this embodiment, used primarily for abatement of gaseous fuels, the duct burner can be utilized to further raise the exhaust temperature of the Stirling cycle engine for higher steam turbine electrical power generation and or direct and indirect heating application. In such use, the effluent gases from the thermal oxidation apparatus 10 pass on to the duct burner 17 located downstream of thermal oxidation apparatus 10. Inside the duct burner 17, the remaining VOC's within the effluent gas from the thermal oxidation apparatus 10 will be effectively incinerated or oxidized.

Figure 3:
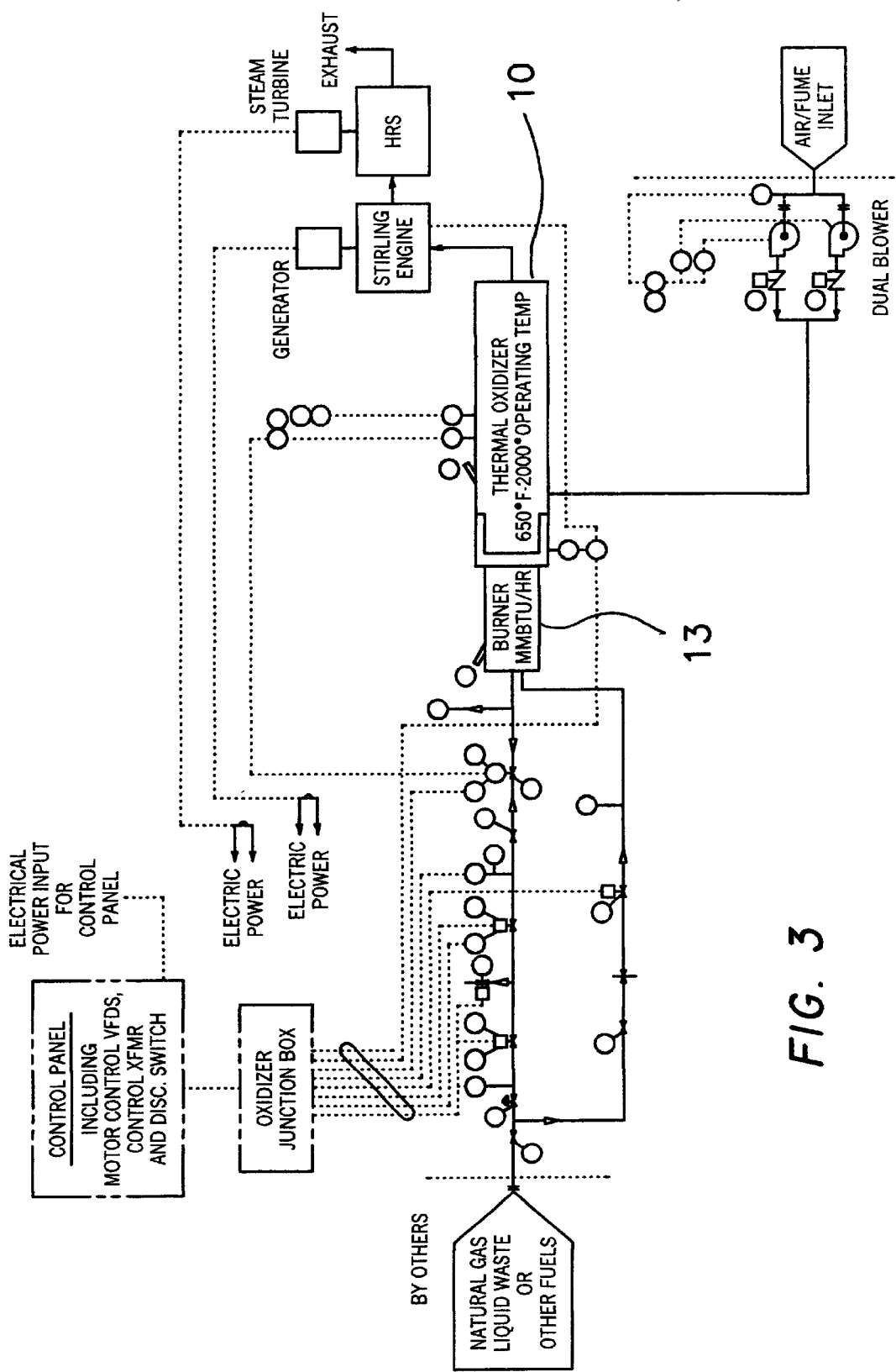
FIG. 3 is a schematic of the Stirling Abatement system for gaseous fuel of the present invention.

In an additional embodiment, referring now to FIG. 3, the contents of which are incorporated herein by reference, the system represented here utilizes a burner 13 prior to the thermal oxidizer 10. This embodiment is also used primarily for abatement of gaseous fuels, the burner to increase the temperatures of the Stirling cycle engine for most efficient use of energy and resources.

It can thus be seen that the present invention provides appropriate control and destruction of pollutants including VOC's and solid waste by products, while at the same time providing cost efficient electrical power and thermal energy. In addition, this system can abate and process waste while at the same time reducing the need for power by converting pollution into energy.

While this invention has been described with respect to various specific examples and embodiments, it is to be understood that the invention is not limited thereto and that it can be variously practiced within the scope of the disclosure.

What is claimed is:

1. An apparatus for abatement of waste components comprising:
   a thermal oxidation apparatus sized and adapted to receive an amount of an oxygen component, a controlled amount of fresh air, a controlled amount of a fuel component, and an amount of a gaseous component to be thermally oxidized and to provide a location for the combustion of said oxygen component and said fuel component, at least the partial thermal oxidation of said gaseous component and the formation of a gaseous effluent;
   an abatement retention chamber, connected to said thermal oxidation apparatus, to which said gaseous effluent is passed and where said gaseous effluent is maintained at conditions effective to thermally oxidize said gaseous component, thereby producing an exhaust gas;
   said abatement retention chamber being capable of accepting secondary pollutants for incineration therein;
   a fuel control assembly to control the amount of fuel component passed to said thermal oxidation apparatus based on the temperature in said abatement retention chamber so as to maintain the temperature in said abatement retention chamber at at least a predetermined, minimum value;
   a Stirling cycle engine located downstream from said abatement retention chamber and to which said exhaust gas is passed; said engine being capable of further thermal oxidation of said exhaust gas and other secondary pollutants and generating a useful product; and
   a heat transfer assembly located so as to receive said exhaust gas to transfer heat from said exhaust gas, thereby generating a useful product.

2. The apparatus of claim 1 wherein said abatement retention chamber includes a catalyst.

3. The apparatus of claim 1 wherein said gaseous component to be thermally oxidized is selected from the group consisting of hydrocarbons, substituted hydrocarbons and mixtures thereof.

4. The apparatus of claim 1 wherein said secondary pollutants to be oxidized may include liquid pollutants.

5. The apparatus of claim 1 wherein said secondary pollutants to be oxidized may include gaseous pollutants.

6. The apparatus of claim 1 wherein said secondary pollutants to be oxidized may include a mixture of liquid or gaseous pollutants.

7. The apparatus of claim 1 wherein said secondary pollutants to be oxidized may include solid waste products.

8. The apparatus of claim 1 wherein the exhaust produced by said Stirling cycle engine is collected for direct heating.

9. The apparatus of claim 1 wherein the exhaust produced by said Stirling cycle engine is collected for indirect heating.

10. The apparatus of claim 1 wherein said heat transfer assembly transfers heat from said exhaust gas, thereby indirectly generating a useful product.

11. The apparatus of claim 1 wherein said heat transfer assembly located to receive said exhaust gases may further include an absorption chiller for disposal of exhaust gases.

12. The apparatus of claim 1 wherein said additional control assembly monitors the pressure of the steam generated.

13. The apparatus of claim 1 which further comprises a gaseous component control assembly to control the amount of the gaseous component passed to said combustion zone based on the pressure of the gaseous component upstream of the point at which the amount of the gaseous component passed to said combustion zone is controlled.

14. The apparatus of claim 1 wherein said gaseous component includes at least one volatile compound and said exhaust gas includes the thermally oxidized product or products of said volatile organic compound, said thermally oxidized product or products being more environmentally suitable in comparison to said volatile organic compound.

15. The apparatus of claim 1 wherein said fuel component includes one or more hydrocarbon components.

16. The apparatus of claim 1 wherein said heat transfer assembly located to receive said exhaust gases may also produce steam and said heat transfer assembly further comprises a steam control assembly to control the amount of steam.

17. The apparatus of claim 8 wherein said steam control assembly is effective to control the flow path of said exhaust gas.

* * * * *